United States Patent
Arnold et al.

(10) Patent No.: US 8,042,819 B2
(45) Date of Patent: Oct. 25, 2011

(54) FOLDING CART FOR GALLEY

(75) Inventors: Geraldine Arnold, Winston-Salem, NC (US); Craig Cunningham, Milton Keynes (GB); Peter Burd, Winston-Salem, NC (US); Mark Detisi, Camarthenshire (GB)

(73) Assignee: BE Aerospace, Inc., Wellington, FL (US)

( * ) Notice: Subject to any disclaimer, the term of this patent is extended or adjusted under 35 U.S.C. 154(b) by 818 days.

(21) Appl. No.: 11/950,838

(22) Filed: Dec. 5, 2007

(65) Prior Publication Data

US 2008/0129002 A1 Jun. 5, 2008

Related U.S. Application Data

(60) Provisional application No. 60/868,627, filed on Dec. 5, 2006.

(51) Int. Cl.
*B62B 3/02* (2006.01)

(52) U.S. Cl. ........................ 280/47.34; 280/639; 280/638

(58) Field of Classification Search ................... 280/638, 280/639, 38, 651, 47.34, 30, 31, 33.991
See application file for complete search history.

(56) References Cited

U.S. PATENT DOCUMENTS

| | | | |
|---|---|---|---|
| 3,286,752 A * | 11/1966 | Duryee, Jr. ..................... 220/9.3 |
| 3,367,676 A | 2/1968 | Pearson et al. |
| 3,633,932 A * | 1/1972 | Holden .......................... 280/641 |
| 3,722,905 A * | 3/1973 | Solomon .......................... 280/39 |
| 3,945,660 A * | 3/1976 | Zalewski .......................... 280/42 |
| 3,992,038 A * | 11/1976 | Guadano, Sr. ................. 280/659 |
| 4,326,731 A * | 4/1982 | Woychio et al. ............. 280/641 |
| 4,729,303 A | 3/1988 | Durbin |
| 5,125,674 A * | 6/1992 | Manuszak ....................... 280/30 |
| 5,330,141 A * | 7/1994 | Kim ................................ 248/98 |
| 5,667,066 A * | 9/1997 | Simpson ...................... 206/278 |
| 5,860,658 A * | 1/1999 | Callahan ....................... 280/30 |
| 5,887,531 A * | 3/1999 | Covill ............................ 108/174 |
| 5,915,723 A * | 6/1999 | Austin .......................... 280/651 |
| 6,079,777 A * | 6/2000 | Simmons et al. .......... 297/217.1 |
| 6,354,619 B1* | 3/2002 | Kim .............................. 280/651 |
| 7,036,161 B2 | 5/2006 | Harrison et al. |
| 7,055,847 B2* | 6/2006 | Miller et al. .................. 280/638 |
| 7,229,093 B1* | 6/2007 | Carter ........................... 280/651 |
| 2003/0025301 A1* | 2/2003 | Banuelos, III ............... 280/651 |
| 2005/0275195 A1* | 12/2005 | Matula et al. ................. 280/651 |
| 2006/0091625 A1* | 5/2006 | Naude et al. ............. 280/33.991 |
| 2007/0175892 A1* | 8/2007 | Izumi ............................. 220/9.4 |
| 2007/0278768 A1* | 12/2007 | Lynam .......................... 280/651 |
| 2008/0061524 A1* | 3/2008 | Goldszer ..................... 280/47.34 |
| 2008/0217886 A1* | 9/2008 | Poppinga et al. ............. 280/651 |
| 2010/0090444 A1* | 4/2010 | Chen et al. .................... 280/651 |

* cited by examiner

*Primary Examiner* — Hau Phan
*Assistant Examiner* — Travis Coolman
(74) *Attorney, Agent, or Firm* — Oliff & Berridge, PLC

(57) ABSTRACT

A foldable galley cart including a plurality of frame members that are hinged together to form an expandable frame, a flexible material attached to and carried by the frame that forms a generally rectangular-shaped, open-topped bin when the frame is in an expanded configuration, at least one set of wheels rotatably attached to the frame, and a handle attached to the frame. A collapsible galley cart for serving food containers during a flight that is collapsible so that it may be readily stored within a compartment of an aircraft galley unit between uses.

4 Claims, 4 Drawing Sheets

FOLDING CART FOR GALLEY

CROSS-REFERENCE TO RELATED APPLICATIONS

This application claims priority to U.S. Provisional Patent Application No. 60/868,627 filed Dec. 5, 2006 and entitled "Folding Cart for Galley."

TECHNICAL FIELD AND BACKGROUND OF THE INVENTION

1. Technical Field

The present invention relates generally to the interior fittings of vehicles, and more particularly, to a galley cart that includes wheels for facilitating galley container transport and is foldable so that the cart may be stowed within a galley unit.

2. Background of the Invention

Manufacturers of vehicle interior fittings are constantly trying to maximize the limited space available for stowing items in passenger services areas, such as lavatories and galleys. These areas typically include a number of storage compartments for storing items in a safe and easily accessible manner, and often include compartments arranged from floor to ceiling. Heavy containers, such as food and beverage service carts are typically stored at floor level and include attached wheels to facilitate transport throughout the cabin. Other containers may be stored at a level above the floor, often times overhead, and typically do not include attached wheels. Thus, it can not only be difficult to stow and retrieve these items from elevated compartments, it can also be difficult to transport these items because of their lack of attached wheels. Further, although not always heavy, it can also be difficult to transport multiple items at one time. Items that may benefit from an improved way of transporting them include, but are not limited to, food and beverage containers, galley appliances, trash as well as any item stored throughout other areas within the vehicle cabin.

In this regard, what is desired is an apparatus for facilitating the transport of heavy, bulky or multiple items that do not include attached wheels. Further, what is desired is an apparatus for transporting items that is sturdy, lightweight and collapsible so that it may be safely and efficiently stowed within a compartment of a vehicle interior between uses, such as within a compartment of a galley unit.

SUMMARY OF THE INVENTION

To achieve the foregoing and other objects and advantages, and in accordance with the purposes of the invention as embodied and broadly described herein, the present invention provides an apparatus for carrying galley containers, trash and other items within a vehicle cabin and outside of the vehicle.

In one embodiment, the present invention provides a wheeled cart for carrying a galley container for food delivery. The cart is preferably collapsible to a compact shape to facilitate stowing the cart within a storage compartment of a galley unit, such as a galley unit of an aircraft. The cart is preferably expandable and defines a carrier portion for carrying one or more containers or other items.

The cart includes a frame comprising a plurality of rigid frame members that are hinged together to form a sturdy and collapsible/expandable frame. A flexible material is attached to the frame and forms a flexible envelope in which containers and other items are placed. In further embodiments, the envelope includes one or more stiffening elements to improve the weight bearing capability of the cart. A handle is attached to a portion of the frame to control the movement of the cart, and one or more sets of wheels are attached to the frame to facilitate movement. The frame members may be constructed from any suitable material including, but not limited to, aluminum. Aluminum is desirable because of its strength and light weight. The flexible envelope material may be constructed from any suitable material including, but not limited to, Kevlar fabric.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in other forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the drawings.

Figure 1:
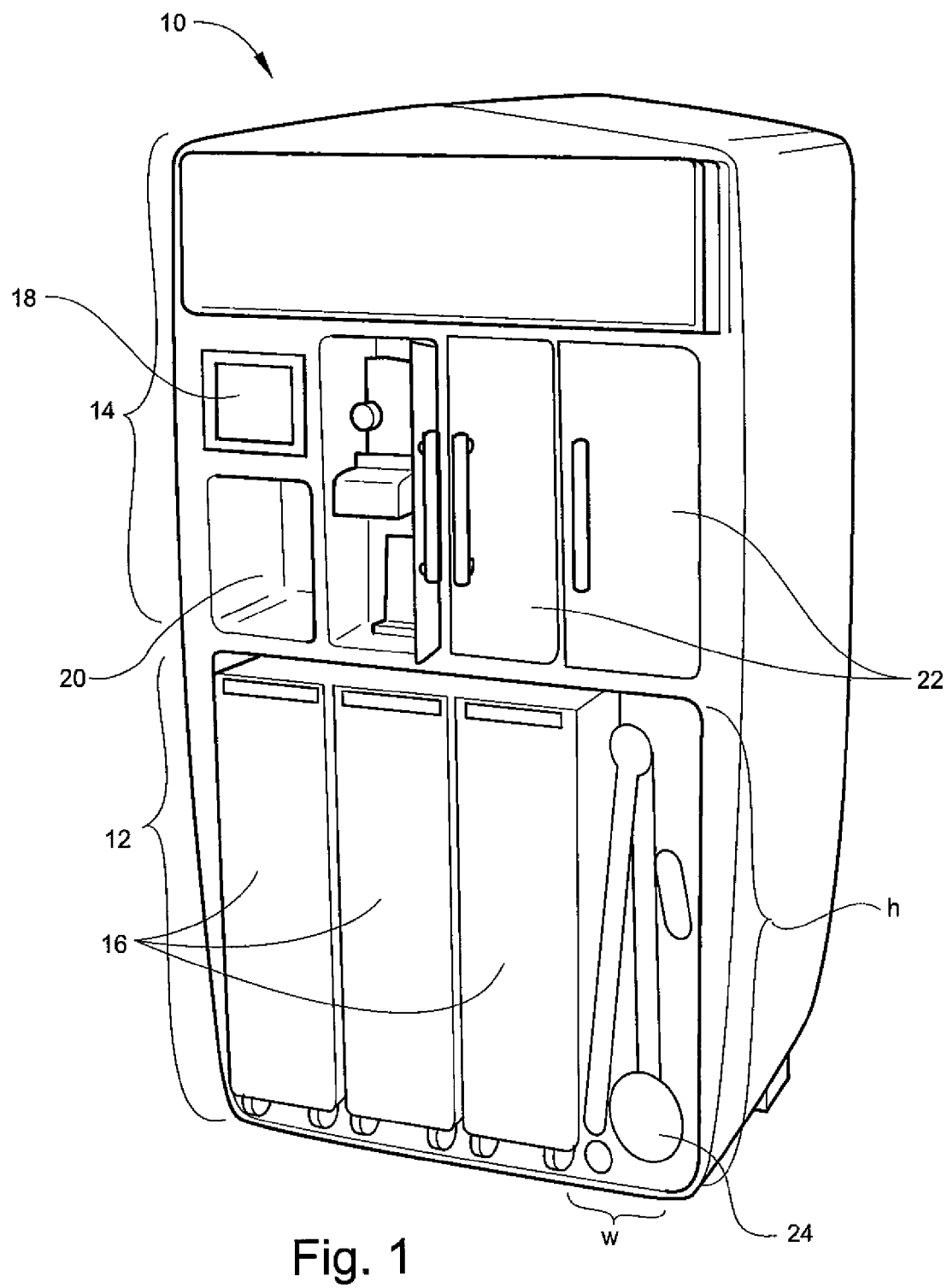
FIG. 1 is a perspective view of a galley unit defining a plurality of compartments and including a folding cart and other galley items stowed therein.

Referring now to FIG. 1, an exemplary galley unit of the type found in an aircraft cabin is shown generally at reference number 10. The galley unit defines a lower storage area 12 and an upper storage area 14. Heavy and larger items are typically stowed within the lower storage area 12, and examples of these types of items include conventional wheeled galley carts 16 and other containers that include attached wheels for rolling the carts up and down the aisles during the food and beverage service of a flight. The lower storage area 12 is sized and shaped to accommodate any number of wheeled carts, and as shown in FIG. 1 accomodates three carts 16. Lighter items and those without attached wheels are typically stowed within the upper storage area 14 above the galley carts, and oftentimes are stowed overhead. Appliances such as coffee makers and microwave ovens for food and beverage preparation are typically stowed at a comfortable working level. As shown, the galley unit 10 includes drawers 18, open compartments 20 and compartments having doors 22. Suitable galley units include any number of compartments arranged in any configuration.

The galley unit 10 includes a galley cart 24 stowed within the lower storage area 12 along with the food and beverage carts 16. When in a collapsed configuration, the galley cart 24 has a height h and a width w preferably about equal to or less than that of a conventional service cart 16 so that the cart can be stored alongside the service carts. The cart 24 may be maintained within a galley unit compartment using any conventional means for preventing the cart from shifting during flight. When needed, the cart 24 is removed from its storage compartment and expanded.

Figure 2:
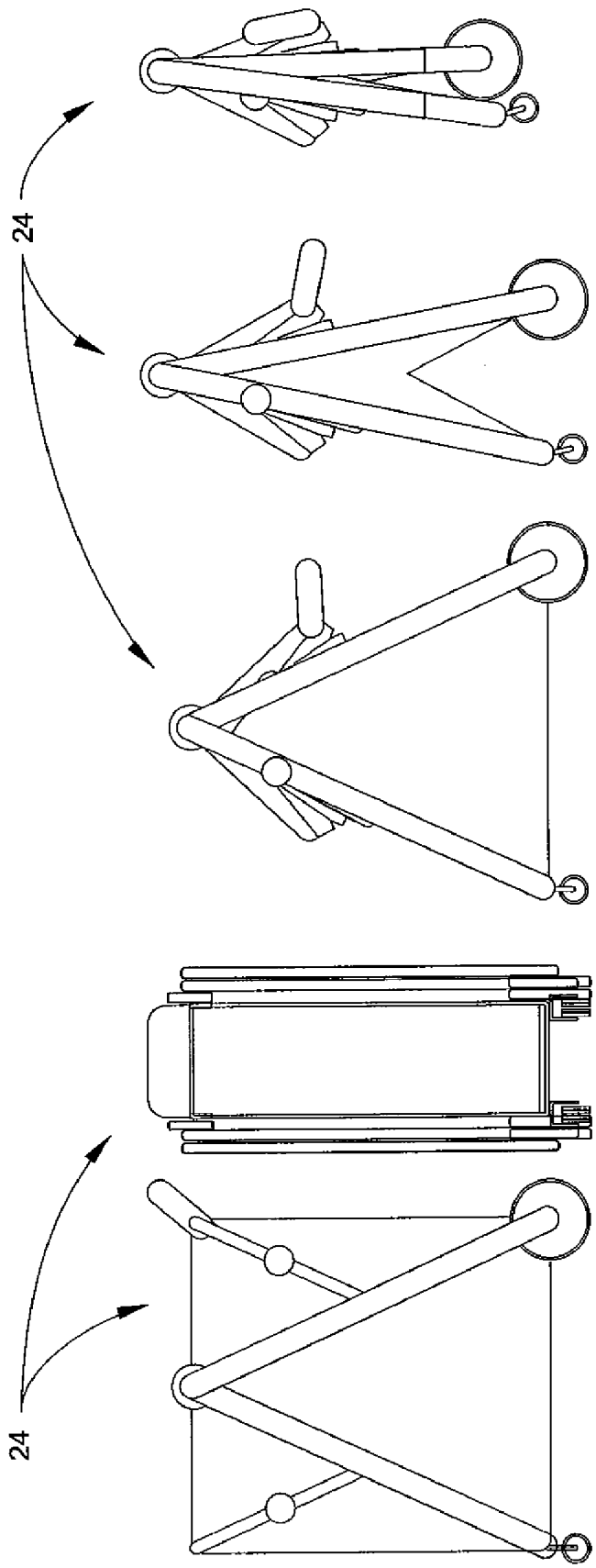
FIGS. 2A-2E are sequential side views of the folding cart of FIG. 1 shown deployed from a folded position.

Referring to FIGS. 2A-E, the galley cart 24 is shown deployed in stages from a completely folded or collapsed configuration (FIG. 2A), to a completely expanded configuration (FIG. 2E). FIG. 2A shows the cart 24 in the fully collapsed configuration. FIG. 2B shows the cart in about a ¼ expanded configuration. FIG. 2C shows the cart in about a ½ expanded configuration. FIGS. 2D and 2E show the cart in the fully expanded configuration.

Figure 3:
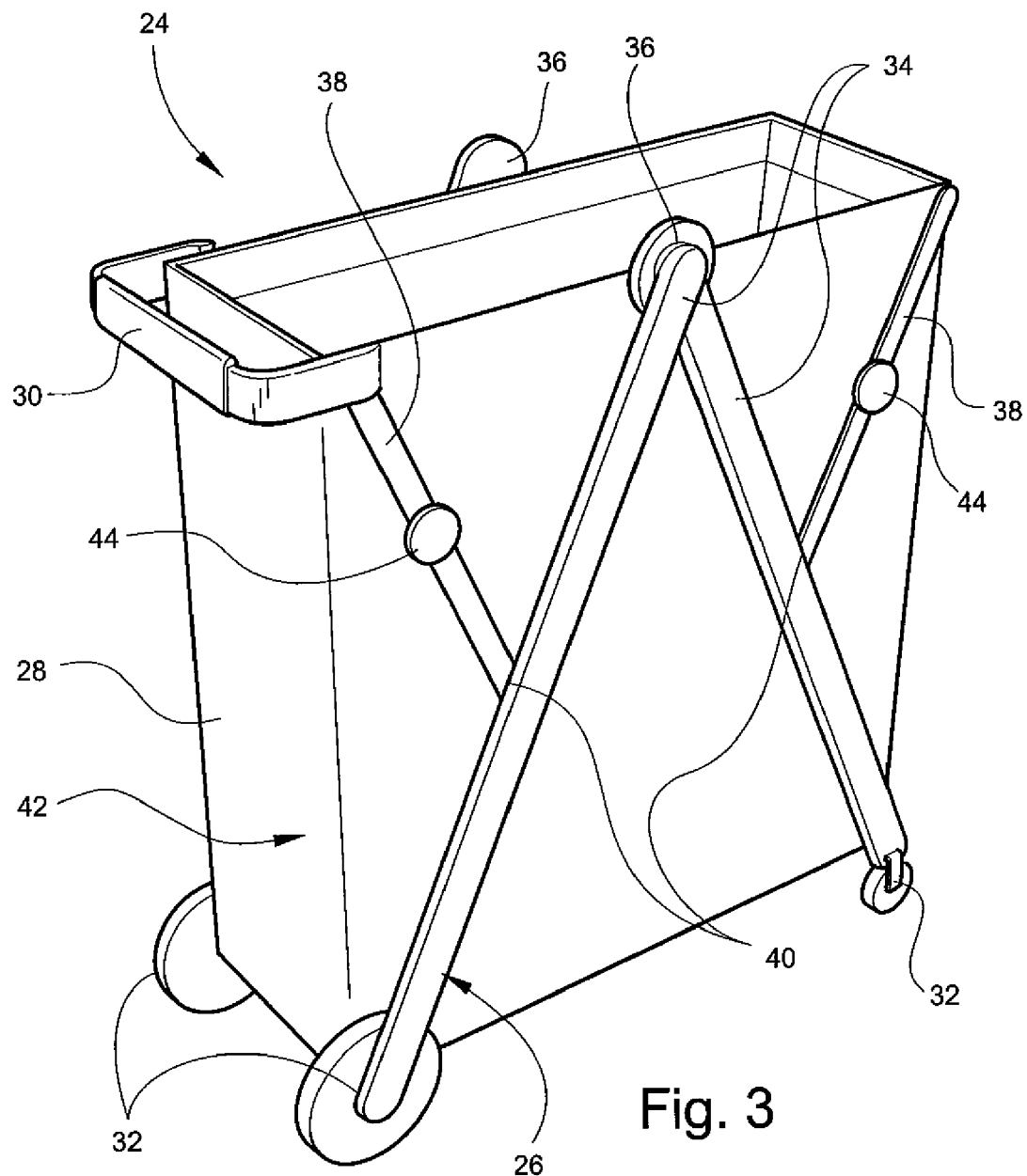
FIG. 3 is a perspective view of the folding cart of FIG. 1 shown with the frame and envelope forming material in a fully deployed position.
Figure 4:
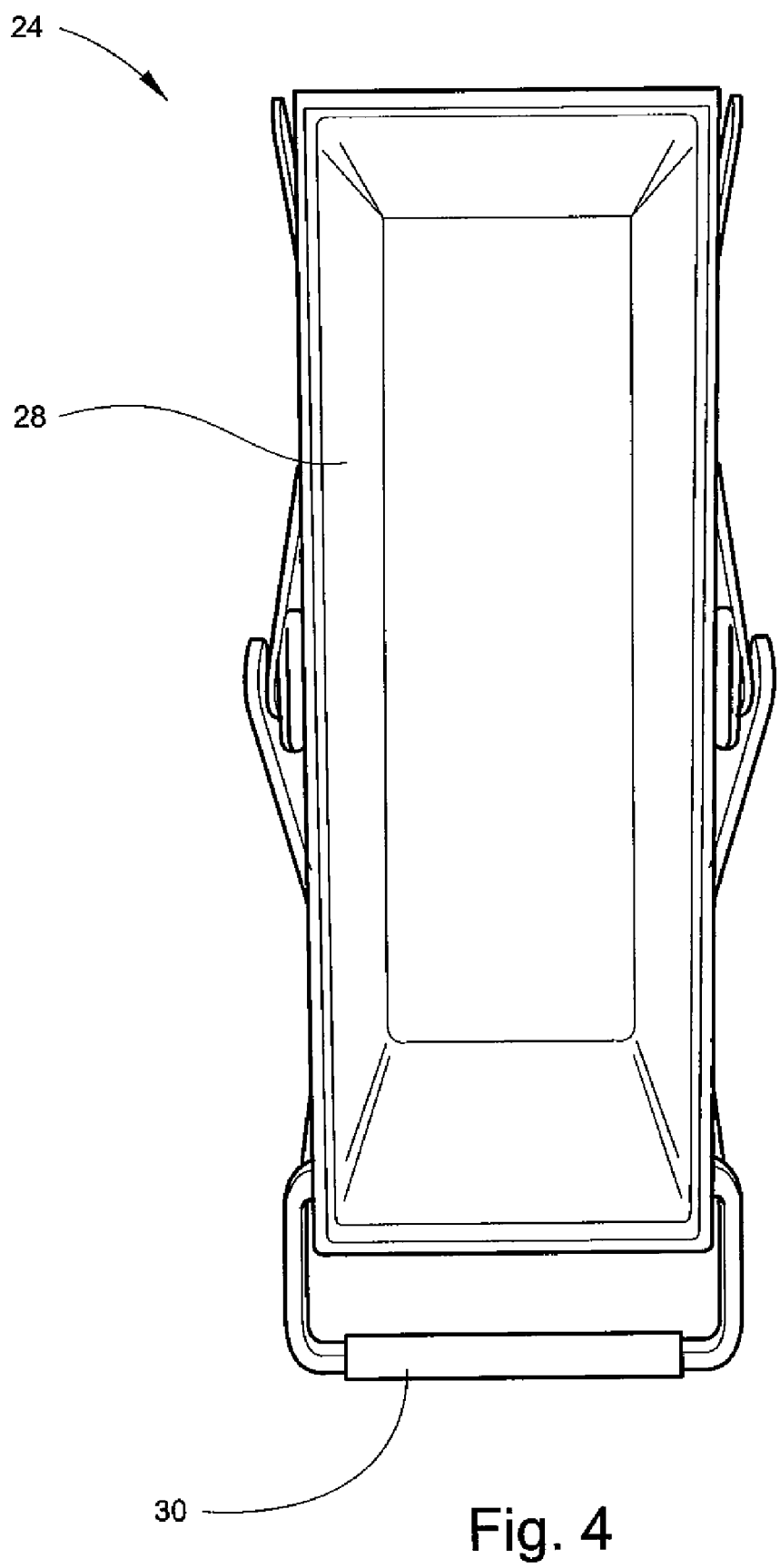
FIG. 4 is a top view of the folding cart of FIG. 1 shown in a fully deployed position.

Referring to FIGS. 3 and 4, perspective and top views of the folding cart 24 are shown, respectively. The folding cart 24 includes a rigid frame 26, a fabric envelope 28 supported by the frame, a handle 30 and at least one set of wheels 32 rotatably attached to the frame. The frame 26 includes first frame members 34 to which the at least set of wheels are attached. The frame members 34 are hinged together at 36, thus allowing an angle of rotation between the frame members. Secured to the first frame members 34 at about a midspan point along the first frame members are second frame members 38. The second frame members 38 pivot about the first frame members 34 at 40. The second frame members each include an elbow 44 for collapsing the second frame members. The handle 30 is supported by the second frame members and is used to control the cart. The handle may be pushed or pulled. The frame members are preferably made from strong and light weight materials, such as aluminum or plastic. At least one set of wheels 32 preferably rotates about an axle.

The frame defines a supporting structure for the flexible envelope 28. The envelope is constructed of fabric, plastic or any other suitable flexible material. In a specific embodiment, the envelope is a woven aramid fiber material (e.g. Kevlar fabric) chosen for its strength and durability. The envelope 28 is attached to the frame members at various points which define the shape of the envelope when fully expanded. When in both expanded and collapsed configurations, the envelope preferably remains within the dimensions of the frame to make the cart compact and prevent snagging. The envelope 28 may optionally include one or more stiffening elements such as wires, rods, or netting to stiffen its edges 42 and/or improve its weight bearing capability. When expanded, the frame 26 stretches the envelope into a generally rectangular, open-topped bin.

In use, the folding cart 24 would be removed from the lower storage area 12 and then unfolded to the deployed position. One or more storage containers or other items, such as dishes, prepackaged meals, trash etc. is placed in the envelope 28 and rolled to wherever necessary. The folding cart facilitates transportation for containers and items that would otherwise have to be hand carried.

The foregoing is a description of various embodiments of the invention that are given here by way of example only. Other embodiments may perform similar functions and or achieve similar results. Any and all such equivalent embodiments and examples are within the spirit and scope of the present invention and are intended to covered by the claims.

What is claimed is:

1. A foldable galley cart, comprising:
   first and second frames, each frame comprising:
   first and second primary frame members each having a first and second distal end;
   first and second secondary frame members each having a first and second distal end;
   a primary hinge pivotally connecting the respective first distal ends of the first and second primary frame members;
   a first secondary hinge pivotally connecting the second distal end of the first secondary frame member to a midpoint of the first primary frame member;
   a second secondary hinge pivotally connecting the second distal end of the second secondary frame member to a midpoint of the second primary frame member;
   the cart further comprising a flexible material attached to and carried by the first and second frames that forms a generally rectangular-shaped, open-topped bin when the frame is in an expanded configuration;
   one or more stiffening elements extending around a top perimeter of the bin and being connected to the first distal ends of the respective primary and secondary frame members of the first and second frames for stiffening the bin and improving its weight bearing capability;
   at least one set of wheels rotatably attached to the first and second frames; and
   a handle attached to the first and second frames;
   wherein the one or more stiffening elements comprise at least a first and second stiffening element,
   the first and second stiffening elements being configured to be substantially parallel to each other when the cart is in the expanded configuration;
   the first and second stiffening elements being further configured to pivot downwardly toward each other about at least one of the primary hinges when the cart is being converted from the expanded configuration to a collapsed configuration; and
   the first and second stiffening elements being configured to substantially retain their shape when in the collapsed configuration.

2. The galley cart according to claim 1, wherein the cart when in a collapsed configuration is capable of being stowed within a compartment of a galley unit of an aircraft.

3. The galley cart according to claim 1, wherein the primary and secondary frame members are aluminum.

4. The galley cart according to claim 1, wherein the flexible material is a woven aramid fiber material.

* * * * *